United States Patent [19]

Prager et al.

[11] Patent Number: 5,471,240
[45] Date of Patent: Nov. 28, 1995

[54] NONUNIFORMITY CORRECTION OF AN IMAGING SENSOR USING REGION-BASED CORRECTION TERMS

[75] Inventors: Kenneth E. Prager, Los Angeles; Stephen J. Herbst, Redondo Beach; Jerry N. Sisneros, Los Angeles; John J. Wootan, Long Beach; Douglas M. Gleichman, Redondo Beach, all of Calif.

[73] Assignee: Hughes Aircraft Company, Los Angeles, Calif.

[21] Appl. No.: 152,154

[22] Filed: Nov. 15, 1993

[51] Int. Cl.$^6$ .................................................. H04N 5/33
[52] U.S. Cl. .................................................. 348/164; 250/332
[58] Field of Search ............................. 348/164; 250/332, 250/552, 553; 364/571.01, 571.02, 574, 575; H04N 5/33

[56] References Cited

U.S. PATENT DOCUMENTS

| 4,712,010 | 12/1987 | Alm | 348/164 |
|---|---|---|---|
| 4,719,350 | 1/1988 | Alm | 250/332 |
| 4,975,864 | 12/1990 | Sendall et al. | 364/571.01 |
| 5,302,824 | 4/1994 | Prager | 250/332 |

*Primary Examiner*—James J. Groody
*Assistant Examiner*—Cheryl Cohen
*Attorney, Agent, or Firm*—H. P. Gortler; M. W. Sales; W. K. Denson-Low

[57] ABSTRACT

A scene based nonuniformity correction method (40) that computes and applies offset correction errors to a video signal corresponding to an image derived from a imaging sensor (11). A video signal derived from the sensor (11) is processed such that a vector representing offset correction terms is formed, and this vector is initially set to zero. Each element in this vector represents a correction term for a particular detector of the sensor (11). The vector is applied to each pixel of the image by a processor (13) as the pixels are read from the sensor (11). To measure the offset error, the image is separated into vertically oriented regions, each comprising a plurality of channels. The average of each channel within a region is computed (42), and a set of region vectors is foraged, such that there is one region vector for each region. Each region vector is then globally high-pass filtered and then edges larger than a predefined threshold are detected (43), and marked (44). Then, each region vector is further separated into sub-regions (45). The isolated sub-regions are locally high-pass filtered. In one embodiment, the correction terms for each vertical region vector are averaged together, resulting in a single correction vector (48). The correction terms calculated for each vertical region may also be applied individually to each detector of the sensor (11). In this second embodiment, the offset level error in each region for each channel is calculated (49), wherein the offset level error at boundary edges is undefined. The correction terms corresponding to a region are applied as the detector (11) scans the scene and views a portion corresponding to that particular region. The correction terms are smoothed at region boundaries to eliminate noise due to boundary transitions.

18 Claims, 2 Drawing Sheets

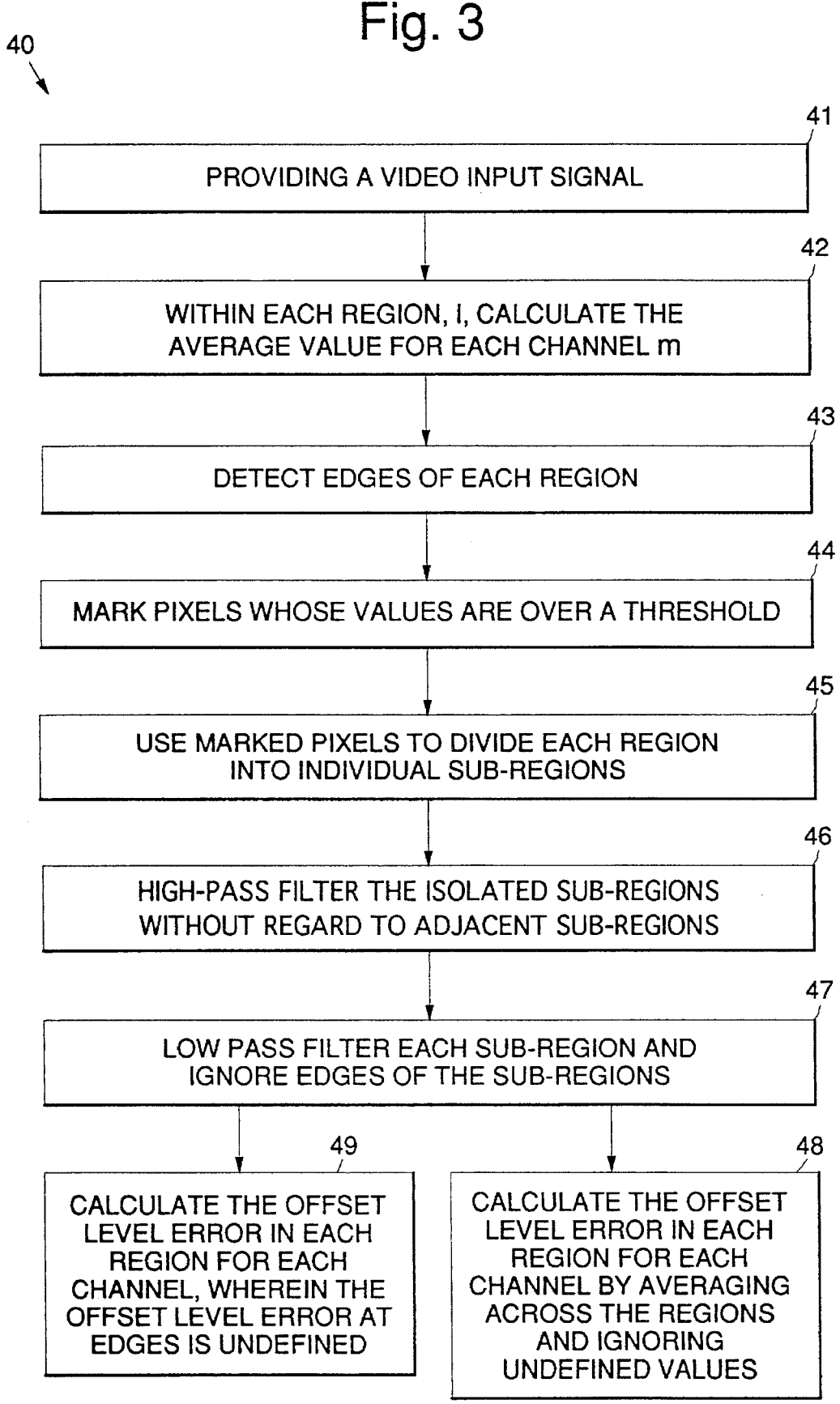

NONUNIFORMITY CORRECTION OF AN IMAGING SENSOR USING REGION-BASED CORRECTION TERMS

BACKGROUND

The present invention relates generally to imaging sensors, and more particularly, to scene based nonuniformity correction methods for use with such imaging sensors.

Nonuniformities appear at an output display of an imaging sensor as fixed pattern noise. The Nonuniformities are described as noise because they result in undesirable information. The nonuniformities are described as a fixed pattern because their characteristics do not change (or change relatively slowly) with time. These nonuniformities may also be thought of as detector gain and offset errors. In the method of the present invention, all errors are treated as offset errors. Thus, the present invention accurately measures the detector offsets using actual scene information.

Once the offset errors have been measured there are several ways in which the corrections may be applied. They may be used as the only source of error correction. They may also be used as fine offset correction terms, in conjunction with coarse offset terms and gain correction terms. These other terms may be calculated using a number of different methods. These methods include coarse offset terms calculated using a thermal reference source; coarse offset and gain terms calculated as part of system initialization; and fine gain terms calculated using thermal reference sources or scene-based methods.

In one current method employed by the assignee of the present invention, one or more thermal reference sources are used to measure nonuniformities for a scanning infrared sensor and provide data for the calculation of correction coefficients that are employed to correct for the nonuniformities. There are several disadvantages related to the use of a thermal reference source-based correction system. First, there is added mechanical complexity which leads to increased system cost. Secondly, system performance may suffer.

System performance suffers for two reasons. In many cases, a separate optical path is utilized for each thermal reference source. Thus, the correction coefficients calculated using the thermal reference source optical path may not be the proper ones for the optical path of the scanning infrared sensor. This leads to imperfect correction. In less sophisticated systems, the temperature of the thermal reference source cannot be controlled. In this case, the thermal reference source may not be at the same temperature as tile scene that is viewed. The correction coefficients thus correspond to the wrong part of the detector response curve. This also leads to imperfect correction. The present method avoids these problems by using scene temperature information. Furthermore, the present invention does not degrade the scene in any manner.

SUMMARY OF THE INVENTION

The present scene-based nonuniformity correction method is used to eliminate image defects in an imaging sensor or video system, such as a scanning infrared sensor or pushbroom sensor, for example, resulting from nonuniformities caused by a detector (focal plane array) and detector readout, for example. The present invention detects, measures, and corrects for nonuniformities in the video output of a imaging sensor without degrading the image. A set of region-based correction terms is calculated and applied to a video signal produced by the sensor using either a feedback or feedforward configuration. After the correction terms are applied, the resultant video signal is suitable for display or further processing.

There are several advantages in using the present method. First the mechanical complexity of the imaging system is reduced, which leads to lower costs because fewer components are required and there is reduced labor required for manufacturing and testing. Secondly an imaging system incorporating the present invention provides better performance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a flow diagram illustrating the scene based nonuniformity correction method in accordance with the principles of the present invention.

DETAILED DESCRIPTION

Figure 1:
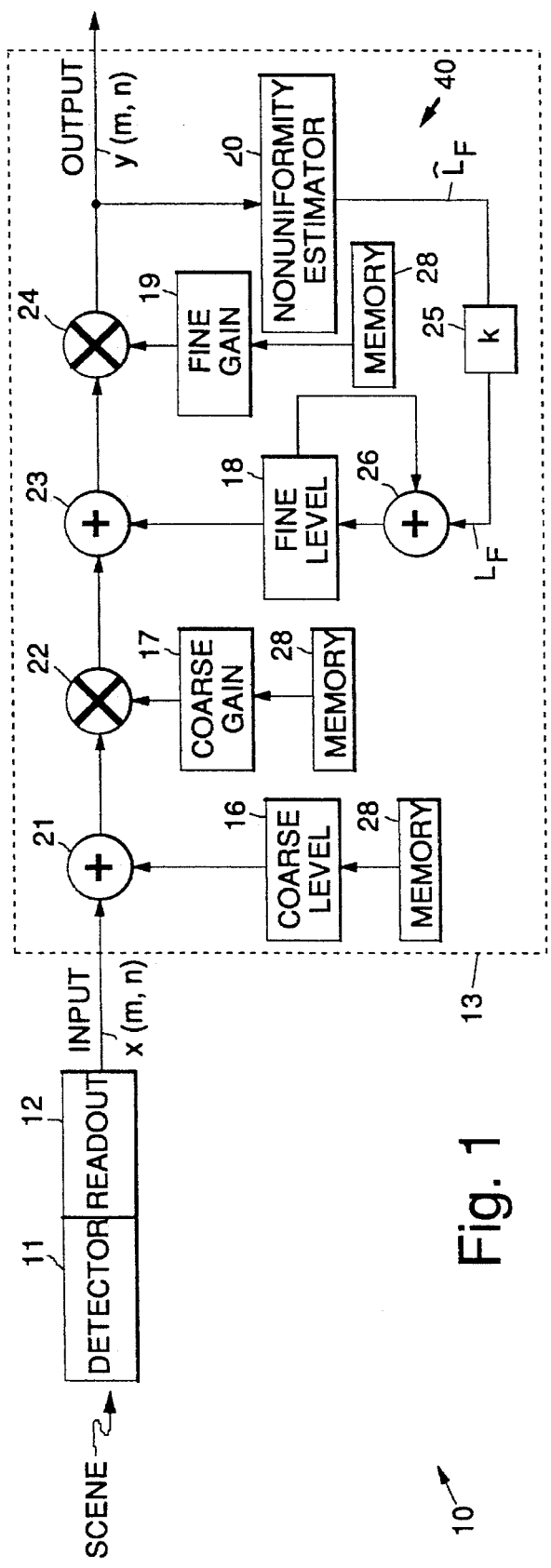
FIG. 1 shows a block diagram of a genetic imaging sensor system incorporating a scene based nonuniformity correction method in accordance with the principles of the present invention.

In order to better understand the present method or algorithm, reference is made to FIG. 1, which shows a block diagram of a generic scanning infrared sensor system 10, or imaging system 10, incorporating a scene based nonuniformity correction method 40 in accordance with the principles of the present invention. The scanning infrared sensor system 10 is comprised of a detector 11 and its readout 12, and the readout is coupled to system electronics 13 that implements scene based nonuniformity method 40. The system electronics 13 implements correction logic that produces coarse and fine correction terms that are applied to the processed video signal. The correction logic includes two offset and gain pairs 14, 15, comprising a coarse offset and gain pair 14, and a fine offset and gain pair 15. The coarse offset and gain pair 14 is comprised of coarse offset level and coarse gain terms 16, 17 that may be calculated using a thermal reference source (internal or external) and pre-stored in a nonvolatile memory 28. The coarse offset level term 16 may also be calculated using a thermal reference source which is updated continuously.

The fine offset and gain pair 15 is comprised of fine offset level and fine gain terms 18, 19. The fine gain term 19 may be set to unity, calculated using thermal reference sources, or calculated using a scene-based algorithm. First and second adders 21, 23 and first and second multipliers 22, 24 are employed to appropriately combine the coarse and fine level and gain terms 16, 17, 18, 19 to produce a corrected video output signal. The present method 40 or algorithm is used to estimate the fine level correction terms 18 and is performed in a nonuniformity estimator 20. The output of the nonuniformity estimator 20 has a loop attenuation factor (k) 25 applied thereto and is coupled to a first input of a third adder 26. A second input of the third adder 26 is provided by the fine level term 18. As such the fine level term 18 is updated with the output of the nonuniformity estimator 20 multiplied by the loop attenuation factor (k) 25.

The expressions and equations that are used in implementing the present algorithm or method 40 will now be described. The variables associated with the system 10 are as follows:

$x(m,n)$ ≡ input,
$y(m,n)$ ≡ output,
$L_C(m)$ ≡ coarse offset level term 16,
$G_C(m)$ ≡ coarse gain term 17,
$L_F(m,n)$ ≡ fine offset level term 18,
$G_F(m)$ ≡ fine gain term 19,
$\hat{L}(m,n)$ ≡ error estimate, and
$k$ ≡ loop attenuation factor 24,
where
$m = (0, M-1)$; M = number of detectors, and
$n = (0, N-1)$; N = samples/detector.
The system input and output are thus related by the equation:

$$y(m,n) = G_F(m)\{(G_C(m)\,[x(m,n)+L_C(m)]+L_F(m,n)\}.$$

The fine level terms are recursively update after each frame. Thus, $$L_F(m,n) = L_F(m,n) + k\hat{L}(m,n).$$

Figure 2:
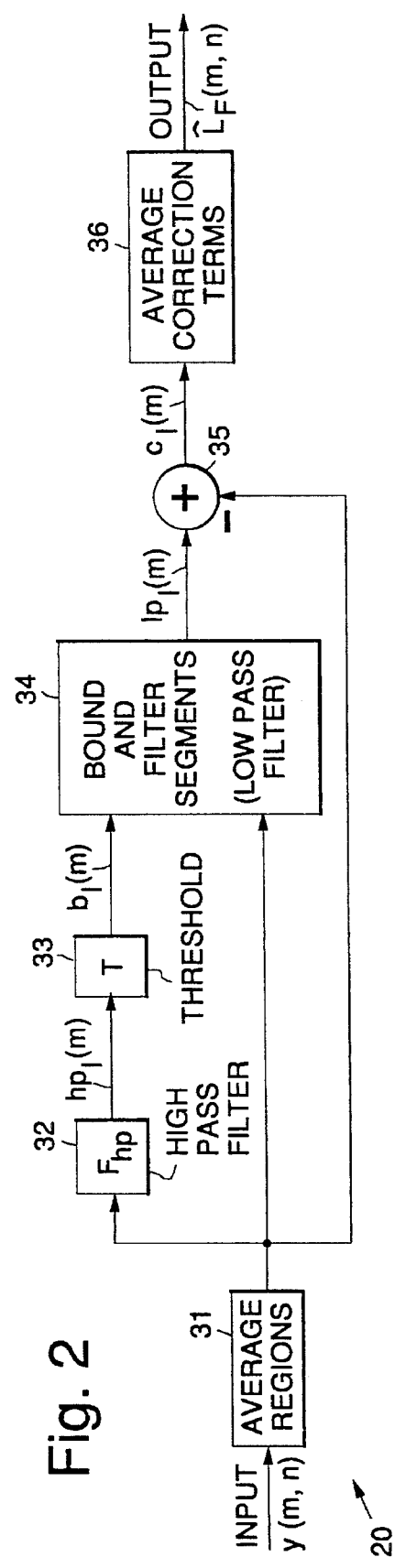
FIG. 2 is a block diagram illustrating calculation of fine offset terms used in the scene based nonuniformity correction method of the present invention that is employed in the imaging sensor system of FIG. 1.

FIG. 2 is a block diagram illustrating calculation of fine offset level terms 18 used in the scene based nonuniformity correction method 40 of the present invention that is employed in the scanning infrared sensor system 10 of FIG. 1 The following terms are defined and are used in implementing the method 40 of the present invention.

$\bar{y}_I(m)$ ≡ horizontal average of a vertical region
$F_{hp}$ ≡ high pass filter operator,
$hp_I(m)$ ≡ high pass version of $\bar{Y}_I$,
$T$ ≡ threshold operator,
$b_I(m)$ ≡ threshold version of $\bar{Y}_I$,
$B$ ≡ segment boundary operator,
$F_{lp}$ ≡ low pass filter operator,
$Ip_I(m)$ ≡ low pass version of $\bar{Y}_I$, and
$c_I(m)$ ≡ vertical region correction term,
where
$I = \{0, L-1\}$; L = number of regions, and
$r = \{0, R-1\}$; R = samples/region.

During an active field time, the scene based nonuniformity correction method 40 collects scene data and calculates the average within each region, for each line therein, illustrated in box 31. This operation is equivalent to implementing the expression:

$$\bar{y}_I(m) = \frac{1}{R} \sum_{i=IR}^{(I+1)R-1} y(m, i).$$

$\bar{Y}_I(m)$ is thus comprised of several column vectors, one for each region. These vectors are then high pass filtered ($F_{hp}$), illustrated in box 32, and thresholded (T), illustrated in box 33, to detect edges. The edges are marked as boundaries. Thus, $$hp_I(m) = (F_{hp}\,\bar{y}_I)$$

$$b_I(m) = (T\,hp_I).$$

These vectors are then low pass filtered, illustrated in box 34, using the boundary information. Pixels marked as boundaries are ignored. This is denoted by the low pass filter operator, $F_{lp}$, and the boundary operator, B. That is, $$Ip_I(m) = (F_{lp}\,(B\bar{y}_I)).$$

Next, each region vector, $\bar{y}_I(m)$, is subtracted from its low pass filtered version in an adder 35, producing the correction term for each region, $c_I(m)$. That is $$c_I(m) = Ip_I(m) - \bar{y}_I(m).$$

Finally, the correction terms are either applied individually for each region, or averaged together, wherein the boundary pixels are ignored. If they are averaged together, illustrated in box 36, the error estimate is calculated using the equation:

$$\hat{L}(m, n) = \frac{1}{L} \sum_{i=0}^{L} c_I(m).$$

For the purposes of completeness, FIG. 3 is a flow diagram illustrating the scene based nonuniformity correction method 40 in accordance with the principles of the present invention. A video input signal is provided, indicated in step 41, such as from the infrared sensor 11 derived from an image. The video input signal is processed such that a vector representing offset correction terms is formed, and this vector is initially set to zero. Each element in this vector represents a correction term for a particular detector of the scanning infrared sensor 11. The vector is applied to each pixel of the image by the processor 13 as the pixels are read from the focal plane array 12.

To measure the offset error, the image is separated into vertically oriented regions, each comprising a plurality of channels. The average of each channel within a region is computed, indicated in step 42, and a set of region vectors is formed, such that them is one region vector for each region. Each region vector is then globally high pass filtered, and edges larger than a predefined threshold are detected, indicated in step 43, and marked, indicated in step 44. Then, each region vector is further separated into sub-regions, indicated in step 45. The isolated sub-regions are high-pass filtered without regard to adjacent sub-regions, indicated in step 46. That is, each sub-region is high pass filtered independently of the other sub-regions. In a first embodiment of the method 40, the correction terms for each vertical region vector are averaged together, resulting in a single correction vector, indicated in step 48.

The correction terms calculated for each vertical region may also be applied individually to each of the detectors. In this second embodiment, the offset level error in each region for each channel is calculated, indicated in step 49, and wherein the offset level error at boundary edges is undefined, that is, not having valves. The correction terms corresponding to a region are applied as the detector 11 scans the scene and views a portion corresponding to that particular region. The correction terms are smoothed at region boundaries to eliminate noise due to boundary transitions. This second method 40 is less sensitive to gain errors in the detector.

Thus there has been described a new and improved scene based nonuniformity correction methods for use with imaging sensors. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A scene based nonuniformity correction method for use with a scanning infrared sensor, said method comprising the steps of:

providing a video input signal derived from an image;

processing the video input signal such that a vector representing offset correction terms is formed, wherein each element in the vector represents a correction term for a particular detector of the scanning infrared sensor and wherein the vector is initially set to zero;

separating the image into vertically oriented regions, each region comprising a plurality of channels;

computing an average of each channel within a region forming a set of region vectors, such that there is one region vector for each region;

globally high-pass filtering each region vector wherein edges larger than predefined threshold are detected and marked separating each region vector into sub-regions demarcated by the edges;

locally high-pass filtering each sub-region computing the offset correction terms for each vertical region vector from said high-pass filtered sub-regions; and applying the offset correction terms to the video signal.

2. The method of claim 1 wherein the step of computing the correction terms comprises the step of averaging the correction terms for each vertical region vector together to produce a single correction vector.

3. The method of claim 1 wherein the step of computing the correction terms comprises the step of calculating the offset correction terms in each region for each channel, wherein the offset correction terms at boundary edges are undefined.

4. The method of claim 1 wherein the step of locally high-pass filtering comprises the step of anti-median filtering the region vector.

5. The method of claim 1 wherein the step of locally high-pass filtering comprises the step of low-pass filtering the region vector and subtracting the resultant vector from an original region vector.

6. The method of claim 1 wherein the step of locally high-pass filtering comprises the step of median filtering the region vector and subtracting the resultant vector from an original region vector.

7. The method of claim 2 wherein the step of locally high-pass filtering comprises the step of anti-median filtering the region vector.

8. The method of claim 2 wherein the step of locally high-pass filtering comprises the step of low-pass filtering the region vector and subtracting the resultant vector from an original region vector.

9. The method of claim 2 wherein the step of locally high-pass filtering comprises the step of median filtering the region vector and subtracting the resultant vector from an original region vector.

10. The method of claim 3 wherein the step of locally high-pass filtering comprises the step of anti-median filtering the region vector.

11. The method of claim 3 wherein the step of locally high-pass filtering comprises the step of low-pass filtering the region vector and subtracting the resultant vector from an original region vector.

12. The method of claim 3 wherein the step of locally high-pass filtering comprises the step of median filtering the region vector and subtracting the resultant vector from an original region vector.

13. A method of processing a video signal from a scanning infrared sensor having an array of detector channels, the method comprising the steps of applying values for gain and offset to the video signal; and updating the values for offset by:

computing averages of detector channels within vertically oriented regions of the sensor, each vertically oriented region comprising a plurality of channels;

forming a region vector for each vertically oriented region from the averages;

detecting edges within the region vectors;

separating the region vectors into sub-regions demarcated by the edges;

locally high-pass filtering the sub-regions;

computing at least one vector of error estimates from the high pass filtered sub-regions; and updating the offset values with the at least one vector of error estimates.

14. The method of claim 13, wherein a plurality of vectors of error estimates is computed and averaged together into a single vector, which is used for updating the offset values.

15. The method of claim 13, wherein the values for offset include a fine offset and a coarse offset, and wherein the fine offset values are updated with the at least one vector of error estimates.

16. The method of claim 15, further comprising the step of applying an attenuator to the at least one vector of error estimates.

17. A method for updating fine offset level correction terms applied to a video signal from a scanning infrared sensor having an array of detector channels, the method comprising the steps of:

computing averages of detector channels within vertically oriented regions of the sensor, each vertically oriented region comprising a plurality of channels;

forming a region vector for each vertically oriented region from the averages;

detecting edges within each region vector;

separating each region vector into sub-regions demarcated by the edges;

locally high-pass filtering each sub-region;

computing error estimates from the high pass filtered sub-regions; and updating the fine offset level correction terms with the error estimates.

18. The method of claim 17, wherein a plurality of vectors of error estimates is computed and averaged together into a single vector, which is used for updating the fine offset level correction terms.

* * * * *